United States Patent [19]

Petrak

[11] 4,238,014
[45] Dec. 9, 1980

[54] AUTOMATIC LOCKING GEAR FOR FOUR WHEELED DRIVE VEHICLES

[76] Inventor: Harry A. Petrak, 2565 Table Mesa Dr., Boulder, Colo. 80303

[21] Appl. No.: 916,288

[22] Filed: Jun. 16, 1978

[51] Int. Cl.³ .................. B60B 27/00; F16D 43/20
[52] U.S. Cl. ............................ 192/54; 192/67 R; 192/93 A; 403/1
[58] Field of Search ............... 192/54, 49, 50, 67 R, 192/67 A, 93 A, 31, 35, 36; 403/1

[56] References Cited

U.S. PATENT DOCUMENTS

| | | | |
|---|---|---|---|
| 3,055,471 | 9/1962 | Warn et al. | 192/35 X |
| 3,217,847 | 11/1965 | Petrak | 192/31 |
| 3,442,361 | 5/1969 | Hegar | 192/67 R |
| 3,656,598 | 4/1972 | Goble | 192/35 |

Primary Examiner—Rodney H. Bonck
Attorney, Agent, or Firm—John E. Reilly

[57] ABSTRACT

An automatic locking gear has been devised in which rapid, positive axial location and driving engagement is established between concentric driving and driven members through the agency of a clutch type actuator mechanism which is responsive to rotation of the driving member to be forced into intermeshing engagement with a complementary receiving member on the driven member. The actuator mechanism is characterized by including a spring-loaded compressible bearing arrangement which normally urges the actuator mechanism into a locked stationary position but will permit retraction of the actuator mechanism away from the locked position whenever torque is applied to the actuator mechanism so that the mechanism is free to travel or rotate with the actuator-receiving mechanism when the driving and driven members are interconnected; and when torque is no longer applied to the actuator mechanism it is free to return gradually into its normal locked position without the application of external forces or control.

18 Claims, 5 Drawing Figures

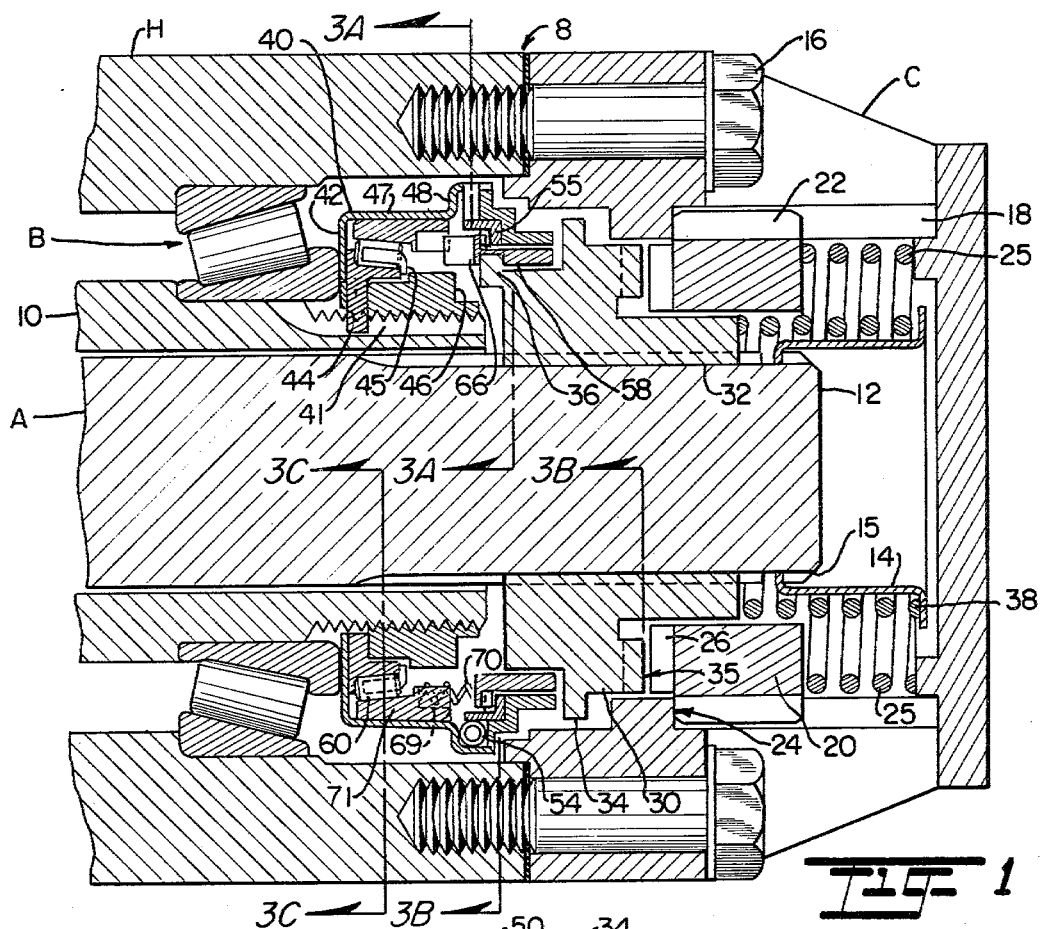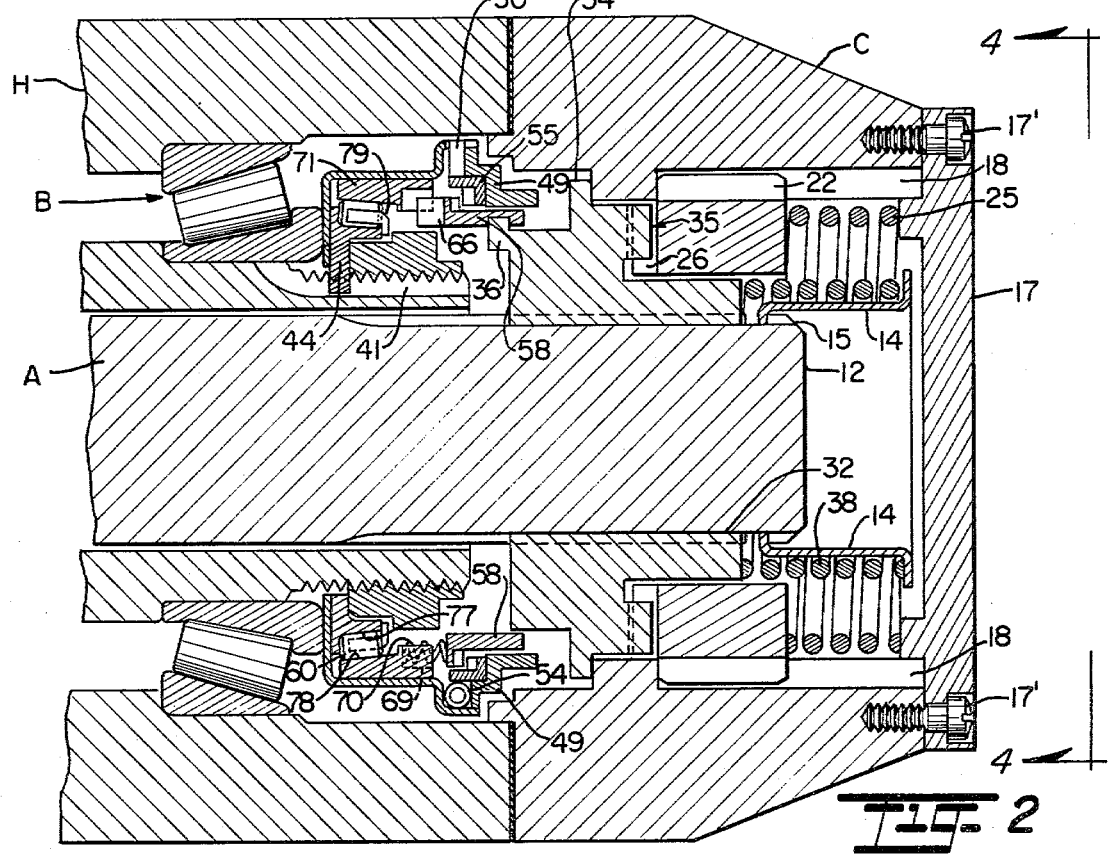

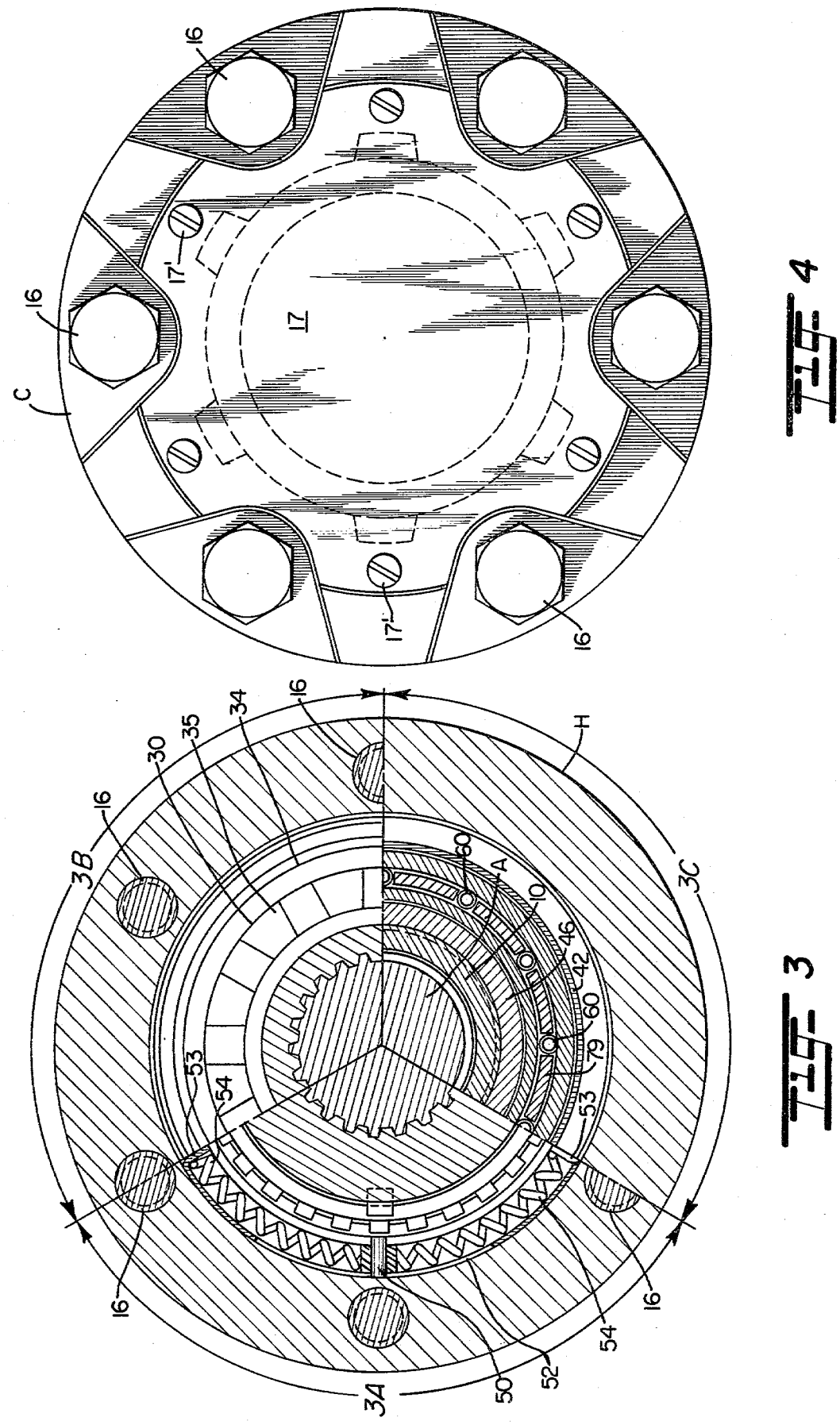

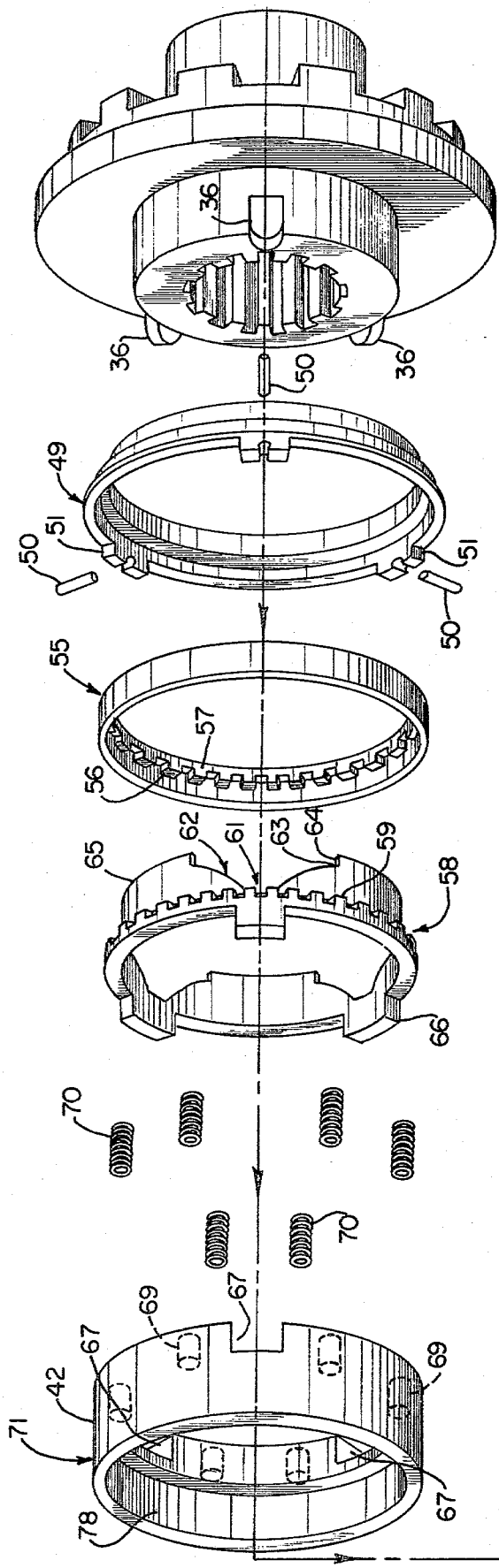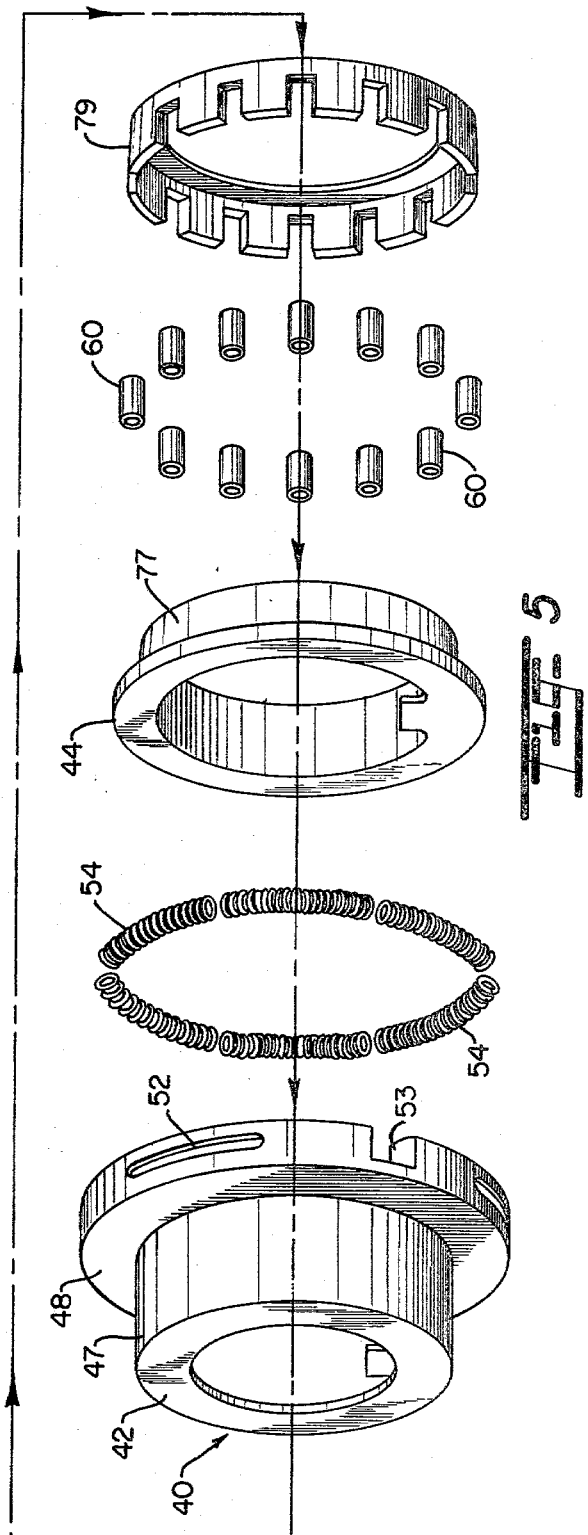

AUTOMATIC LOCKING GEAR FOR FOUR WHEELED DRIVE VEHICLES

BACKGROUND OF THE INVENTION

This invention relates to novel and improved automatic locking gears or mechanical clutches; and more specifically relates to mechanical clutches of the type specifically adaptable for establishing driving connection between an axle and hub of the type employed in four wheel drives and other vehicles with multiple drive axles or drive shafts.

It is customary to employ mechanical clutches in four wheel drives which can be selectively activated in order to establish driving connection between the front drive axle and associated wheel hub in converting the vehicle to a four wheel drive mode. Mechanical clutches are often utilized in other applications to effect the desired driving connection between a driving member and another member to be driven. In four wheel drive applications, manual actuators are often employed to activate the clutch mechanism and effect the desired engagement between the drive and driven members and this approach is typified by the patent to Hegar U.S. Pat. No. 3,442,361 as well as the prior art patents referred to therein.

However, the present invention is more directly concerned with automatic clutches or locking gears which are responsive to the application of power or torque to the driving member, such as, the drive axle of a motor vehicle to effect a direct driving connection with the driven member or wheel hub and to maintain such engagement or axial location between the members regardless of the relative speed of the driving and driven members until torque has been removed from the drive member. In my earlier patent for automatic clutch with locking means, U.S. Pat. No. 3,217,847, an automatic mechanical clutch assembly is disclosed for automatically establishing engagement and disengagement between male and female locking elements in direct response to the torque applied to the driving member, the locking elements being broadly characterized by maintaining reversible engagement between the members; i.e., in either direction of rotation or application of torque to the driving member. Specifically, the clutch automatically effects the desired locking engagement through an actuator or shift mechanism which carries the male locking element and is shifted or caused to be cammed in an axial direction to advance the male locking members into slots associated with the driven member. As disclosed therein, the shift mechanism has cam portions normally retracted with respect to stationary, complementary cam portions on a fixed member so that when torque is applied to the shift member the cam portions rise along the surfaces of the stationary cam portion to advance the locking elements into the desired interengagement with one another. Once engaged, the complementary cam portions are separated with the shift mechanism imparting the driving torque of the drive axle through the locking element into the driven member or wheel hub. When torque is no longer applied to the axle, the shift member is biased or spring-loaded to cause the male locking members to be ejected from the slots. Thus, while the automatic clutch described in my hereinbefore referred to patent was effective to accomplish automatic engagement between the drive and driven members in the manner described, it is desirable to cause selective engagement between the members without the necessity of establishing positive locking engagement between male and female locking elements and in such a way as to greatly minimize the time interval required to effect full engagement and specifically the time period required for the respective cam portions and locking members to move into alignment with one another. Stated another way, it is desirable that the coacting cam portions maintain the same relative alignment even after the shift mechanism is advanced into position for driving engagement with the driven member; and in so moving into position does not require positive interconnection between male and female locking elements.

SUMMARY OF THE INVENTION

In accordance with the present invention, a novel and improved automatic mechanical clutch assembly has been devised in which a shift mechanism is directly responsive to torque applied to a driving member to advance a driven member into position for locking engagement without the necessity of interlocking elements being brought into alignment with one another. Preferably this is accomplished by coacting complementary cam portions between movable and normally fixed actuating members, the cam portions on the movable actuating member being caused to rise and be axially displaced in response to rotation of the driving member so as to shift a drive gear into position for intermeshing engagement with a driven gear associated with the member to be driven.

The continued torque applied by the movable actuating member after the movable actuating member has traveled axially to a predetermined limit causes the normally fixed actuating member to be displaced from a normally fixed retainer so that it is free to follow rotation of the movable actuating member. However, when torque is no longer applied to the driving member, the associated movable actuating member is free to return to its fully engaged or contracted position with the normally fixed actuating member while the latter is returning to its fixed position with the retainer. The retainer is free to undergo limited rotation until it is aligned for locking engagement with the fixed actuating member. The normally fixed actuating member is associated with an improved bearing arrangement which is self-aligning and imparts rotational resistance to the normally fixed actuating member when the radial load on the bearings is increased by an axial displacement of the normally fixed actuating member from the fixed retainer and operates through axial springs to impart a thrust load on the bearing race. The rotational resistance imparted to the normally fixed actuating member causes the member to be driven by the movable rotating member and cam followers extending from the rotating driving member, thereby causing the normally fixed actuating member to maintain a cammed displacement from the fixed retainer during rotation. Conversely when torque is removed from the driving member and it stops rotating the driven normally fixed actuating device will at least momentarily cease to rotate. However, the resistance imparted to the actuating device then drops to a resistance insufficient to maintain the same force relationship between the driver and actuating member, and the cammed driven member is again urged to rotate in the same direction as previously driven while simultaneously camming axially toward the normally fixed position. The rotation and camming of the normally fixed actuating member, after the driving member has ceased to rotate, simultaneously reduces the thrust load on the bearing race, reducing the radial load on the bearings and rotational resistance, and accelerating the independent rotational and axial movement of the actuating member toward its normally fixed position.

Accordingly, it is an object of the present invention to provide for a novel and improved locking gear adaptable for automatically connecting and disconnecting drive and driven members directly in response to torque applied to or removed from the driving member; and wherein the automatic locking gear of the present invention is specifically adaptable for use in converting a vehicle from two wheel to four wheel drive operation automatically in response to torque applied to the drive axle.

It is another object of the present invention to provide for a novel and improved mechanical clutch which is capable of effecting rapid engagement between a drive axle and wheel hub in direct response to application of torque to the drive axle notwithstanding slippage, wheel resistance in either rotational direction, or differences in relative speed of rotation; and is conformable for use with non-slip or limited slip differentials as well as any known types of vehicle transmissions.

It is a further object of the present invention to provide an automatic locking gear for an actuator mechanism capable of establishing driving connection between the drive and driven members without positive interlocking between the actuator and driven member while permitting automatic disengagement over a predetermined time interval when torque is no longer applied to the driving member.

It is an additional object of the present invention to provide an actuator mechanism with automatic locking gear in four wheel drive vehicles in which cooperating cam portions effect engagement and disengagement between the drive and driven members without complete separation or movement away from alignment with one another; and further wherein a novel and improved bearing interface between a fixed member and a normally fixed portion of the actuator mechanism is operative to impart a predetermined resistance to rotation of the normally fixed portion of the actuator mechanism in advancing the driving member into position for engagement with the driven member.

Other objects, advantages and capabilities of the present invention will become more readily apparent when taken in conjunction with the detailed description and drawings:

BRIEF DESCRIPTION OF THE DRAWINGS

FIG. 1 is a cross-sectional view of a preferred embodiment of the present invention with the shift mechanism and clutch illustrated in the disengaged position between a drive axle and wheel hub.

FIG. 2 is a cross-sectional view of the preferred embodiment of the present invention with the shift mechanism and clutch shown in the engaged position.

FIG. 3 is a composite view taken about lines 3A, 3B and 3C of FIG. 1.

FIG. 4 is an end view of the cover flange of the assembly; and

FIG. 5 is an exploded view of the actuator mechanism and drive gear of the present invention.

DETAILED DESCRIPTION OF THE PREFERRED EMBODIMENT

Referring in more detail to the drawings, a preferred form of locking gear assembly 8 is interpositioned between one end of a front drive axle A and wheel hub H in a four wheel drive vehicle. In a well known manner, the end of the front axle A is journaled within a stationary housing or spindle sleeve 10, and the axle A terminates in a splined end portion 12 to which is attached an annular spring support 14 which is secured in snap-fitting engagement on the end of the splined portion 12. Wheel hub H is independently journaled for rotation on a wheel bearing B in outer concentric relation to the spindle housing 10, and an outer casing or cover flange C is attached to the wheel hub by spaced mounting screws 16 so that the assembly 8 is fully enclosed and sealed within the cover flange. The flange C has a closed end or cover plate 17 attached by suitable screws 17' across the outer end of the flange.

In assembled form as described, the cover flange C is of generally cup-shaped configuration having an inner generally cylindrical wall surface provided with axially extending splines 18 disposed at equally spaced circumferential intervals and in outer spaced concentric relation to the splined end 12 of the drive axle A. The splined inner wall surface 18 receives a ring or driven gear 20 which is provided on its external surface with axially extending splines 22 complementary with the splines 18 on the inner wall surface of the cover flange so as to be slidable therealong. The ring gear 20 is supported within the cover flange by an internal shoulder 24 on the inner splined wall surface of the cover flange, and the ring gear 20 is urged against the shoulder 24 by a compression spring 25 interpositioned between the closed end of the cover flange and the outer end surface of the ring gear. The opposite, inner end surface of the ring gear is provided with circumferential spaced, radially extending teeth 26 protruding in an inward axial direction toward a drive gear 30.

An annular or ring-shaped drive gear 30 has circumferentially spaced, axially extending splines 32 on its inner surface, the drive gear 30 being dimensioned to fit over the splined end portion 12 of the drive axle A with the inner splines 32 complementary to the external splines on the end portion 12. The drive gear has an external shoulder flange 34 located beneath the shoulder 24, and a plurality of circumferentially spaced, radially extending teeth 35 are disposed in facing relation and complementary to the teeth 26 on the driven gear 20 and adapted to advance into intermeshing engagement with the teeth 26 to impart rotation from the drive axle A into the wheel hub H. The inner axial end of the drive gear 30 has a series of axially projecting cam followers or lugs 36 which interengage with cam surfaces on a cam lifter in a manner to be hereinafter described. It will be noted that the drive gear 30 is normally urged in a direction away from the ring or driven gear 20 by a compression spring 38 which is disposed between the cup spring support 14 and the outer end surface of the drive gear so that normally the wheel hub H is free to undergo rotation independently of the drive axle.

In accordance with the present invention, the locking gear assembly 8 is disposed in the axle housing to function in such a way as to be responsive to rotation of the drive axle to force the drive gear 30 outwardly in an axial direction to overcome the urging of the compression spring 38 and advance the drive gear teeth 35 into intermeshing engagement with the driven gear teeth 26 whereby to impart the rotation of the axle A to the driven gear 20. As a preliminary to description of the actuator mechanism assembly, it will be noted that an annular generally cup-shaped clutch housing 40 is keyed to a keyway 41 on the axle housing 10 and opens in the direction of the gears 20 and 30, the housing 40 having a radial wall 42 anchored between the inner race of the bearing B and an inner race 44 of a roller bearing 45 which is locked in place by a retainer nut 46. An axially extending portion 47 of the housing 40 is disposed in spaced, inner concentric relation to the wheel hub H and terminates in an annular shelf 48 at one end opposite to the radial wall 42. The shelf is adapted to accommodate a cam retainer ring 49 which is loosely seated on the shelf and has circumferentially spaced pins 50 projecting radially outwardly from dogs 51 on the undersurface of the annular cam retainer, the pins 50 being inserted through circumferentially extending slots 52 spaced along the outer wall of the shelf 48. As shown in FIGS. 3 and 5, spring seats 53 extend radially inwardly of the outer wall of the shelf at equally spaced circumferential intervals, against each of which reaction spring elements 54 are positioned to extend circumferentially in opposite directions to bear against the dogs 51 which are disposed intermediately between the spring seats 53. Further, the cam retainer ring 49 includes an inner ring 55 affixed to and extending in an axial direction with a plurality of teeth 56 disposed along a radial wall surface 57. The teeth 56 may be composed of a metal or abrasion resistant elastomer material and are fixed in place within the recessed area or indentation formed along the wall surface 57.

An ejector or lifter cam 58 is in the form of a ring-like body having teeth 59 on one end biased into engagement with the teeth 56 by axial springs 70 disposed in outer race 71. The cam 58 also has a series of axially directed cam surfaces 62 which initially diverge in opposite directions from low points or valleys 61 at an approximate angle in the range of 30°-45° then level off into more gradual sloped surfaces 63 at an angle of approximately 15° to horizontal then terminate in axially directed edges or abutments 64. Circumferentially extending end surfaces 65 adjoin adjacent cam faces, the cam faces adapted to receive the lugs 36 on the drive gear 30. Axial extensions 66 at the inner end of the cam 58 project into sliding engagement with grooves or recesses 67 of outer race 71. Axially extending compression springs 70 are supported in cylinder-shaped recesses 69 in outer race 71 and are interposed between the lug extensions 66 and the grooves in outer race 71 which receive the extensions 66. In order to permit relative rotation between the inner static race 44 and outer driven race 71, hollow roller bearings 60 are interposed between correspondingly sloped surfaces 77 and 78 of the races, and a roller retainer 79 serves to retain the rollers 60 in spaced relationship. Preferably the roller bearings 60 are hollow and are composed of a metal, such as, spring steel and possessing limited compressibility or resiliency so as to impose some resistance, as a result of rolling deformation, to rotation of the cam 58 when torque is applied by the drive gear.

From the foregoing, it will be noted that the spindle 10 and cup 40 and inner race 44 are fixed members and the wheel hub H is journaled with respect to the spindle 10. FIG. 1 illustrates the preferred form of the present invention in a free-wheeling position in which the outer cover flange C and ring gear 20 are not mechanically connected to the drive gear 30. In this relation, the drive gear 30 has its cam followers or lugs 36 normally disposed at the low points or valleys 61 of the lifter cam 58; and the lifter cam 58 is in turn normally urged by the springs 70 into intermeshing engagement with the teeth 56 on the inner retainer 55 so as to be fixed against rotation by the cam retainer ring 49 and cup 40.

As shown in FIG. 2, automatic locking is effected whenever torque is imparted to initiate rotation of the drive axle A which in turn imparts rotation to the drive gear 30 on the splined end portion 12 of the drive axle. The cam followers 36 will, regardless of the direction of rotation of the drive axle, apply torque to the lifter cam 58, which simultaneously rotates cam retainer 49 causing the pins 50 to rotationally advance through slots 52 against the urging of the springs 54 until the pins abut the limiting opposite ends of their slots 52 preventing further rotation of the cam retainer 49 and cam 58, which is intermeshed with the cam retainer 49 during this stage of operation. Continued rotation of drive gear 30 causes advancement of the cam followers 36 along the sloping cam surfaces 62 thereby forcing the drive gear 30 to move outwardly in an axial direction against the urging of the drive gear spring 38 until the drive gear shoulder flange 34 abuts the internal face of shoulder 24 preventing further outward axial movement of drive gear 30. When drive gear 30 abuts the shoulder 24 it has moved outwardly to a position of full engagement with drive gear 20. Drive gear 30 is restrained from further outward axial movement by the internal face of shoulder 24 and, under continued drive rotation of drive axle A causes cam followers 36 to advance along the more gradually sloped surface portions 63 of lifter cam 58, forcing lifter cam 58 to retract inwardly against the urging of the springs 70. This movement causes a predetermined thrust force to be applied to outer race 71 and, through the conical slope of the inner face 78 of the race 71, multiplies the radial force on bearings 60. Rotation continues with the cam followers 36 continuing to advance along cam surface 63 of lifter cam 58 causing lifter cam 58 to fully disengage from the stationary teeth 56 of the cam retainer 49. Resistance to rotation of the ejected lifter cam 58 resulting from the radial loading of bearings 60 causes the cam followers 36 to advance along slopes 63 furthering the inward movement of cam 58 until followers 36 abut the projecting faces 64 of cam sections 65. Continued rotation of drive axle A and drive gear 30 causes the cam 58 to rotate with the drive gear 30. Upon ejection and disengagement of cam teeth 59 from retainer teeth 56, the retainer 49 and the pins 50 will be free to return to the relative central position of each respective slot under the urging of springs 54. When torque is no longer applied to the axle A and the axle stops rotating, the correspondingly rotating parts 30, 58 and 71 stop rotating. As a result the resistance resulting from rotation and the rolling forces on bearings 60, which was required to drive the cam followers 36 to abut against the cam faces 64, drops to zero. The outward pressure exerted against the inboard face of cam 58 by the compression springs 70 causes an equal pressure to be exerted by the sloped cam surfaces 63 against the cam followers 36 which are integral with the now static drive gear 30. The force of sloped faces 63 against cam followers 36 urges the cam 58 to rotate in the same direction as previously driven. The outward pressure which causes the cam 58 to slidably rotate, simultaneously forces cam 58 to move outwardly to re-engage the retainer 49.

During the outward movement of cam 58, the thrust pressure imposed by the springs 70 against the outer driven race 71 is reduced thereby correspondingly reducing the rotational resistance of the race 71 which enables cam 58 to continue rotating while accelerating the disengagement of gear 30 from gear 20 after reengagement of cam 58 with the retainer 49. The predetermined gap between the teeth 57 of retainer 49 and with the teeth 59 of cam 58 causes full engagement of cam 58 to retainer 49.

As the cam 58 starts to engage the retainer 49, cam 58 has rotated sufficiently to locate the steeper cam slope faces 62 in alignment with followers 36, accelerating cam 58 into full engagement with retainer 49 and thereafter allowing rapid disengagement of gear 30 from gear 20 under the urging of spring 38 which exerts an axial thrust force considerably greater than the circumferential forces of springs 54 and causing the re-engaged retainer 49 and cam 58 to rotate rapidly. The slots 52 through which pins 50 extend are of a circumferential length greater than the circumferential degrees or length between the two cam abutments 64 of each cam opening, which allows the cam followers 36 to accelerate their return to and against the cam bottoms 61.

In the preferred form of invention, the combined spring force of the springs 70 is selected so as to be greater than that of the drive gear spring 38 and is most desirably selected to be at a spring ratio of two-to-one or greater ratio. Moreover, the radius of curvature of the cam surfaces 62 and 63 is preferably designed to provide a first relatively steep slope along the cam surface 62 on the order of 30°–45° in causing the cam members 36 to ride outwardly and force the drive gear into engagement with the driven gear, followed by a more gradual slope on the order of 15°–18° along the surfaces 63 in causing the ejector cam to be separated from the cam retainer so as to be free to rotate with the drive axle. Specifically, the steeper slope along the faces 62 is designed to assure that a sufficient vertical or axial component of force is applied through the cam followers 36 to overcome the spring force of the drive gear spring 38; whereas the more gradual slope along the surfaces 63 is established to overcome the compression spring force of the clutch springs as well as the resistance to turning which is imparted by the inner clutch bearing.

It will be evident that the actuator mechanism is adaptable for use in applications other than four-wheel drive units as described. Further, if it is desired to disengage the drive gear 30 from ring gear 20 by reversing the rotation of the drive gear 30 it is not essential to resist the rotation of the cam 58, such as, by the hollow roller bearings 60 or to permit limited rotation of the cam retainer 49 in establishing realignment between the retainer 49 and cam 58. In this connection, the reversing of the driven gear, such as would occur by backing up the vehicle, will accomplish more rapid disengagement than by automatic disengagement with a predetermined time lag in accordance with the preferred form of invention.

Although the present invention has been disclosed with particularity relative to the foregoing detailed description of the exemplary preferred embodiments, various changes, modifications, additions and applications other than those specifically mentioned herein will be readily apparent to those having normal skill in the art without departing from the spirit of this invention.

What is claimed is:

1. A clutch assembly adapted to drivingly connect a driving member to an outer concentric driven member automatically in response to the application of torque to said driving member, said clutch assembly comprising:
   a locking member;
   an axially movable cam member having circumferentially spaced cam surfaces axially directed away from said locking member, and resilient means yieldingly urging said cam member into locking engagement with said locking member; and
   cam follower means associated with said driving member and interposed between said cam member and said driven member, said cam follower means including circumferentially spaced lugs interengaging with said cam surfaces, said lugs being movable along said cam surfaces in response to the application of torque to said driving member whereby to urge said driving member axially into engagement with said driven member while imparting an axial thrust to said cam member sufficient to overcome the urging of said resilient means and to release said cam member from locking engagement with said locking member.

2. A clutch assembly according to claim 1, said locking member and said cam member having interengaging teeth therebetween, and said locking member being capable of undergoing limited rotation through a distance substantially corresponding to the circumferential distance of movement of said cam follower means along said cam surfaces.

3. A clutch assembly according to claim 2, said locking member including bias means normally urging said locking member to rotate in a direction opposite to the direction of movement of said cam follower means with respect to said cam member.

4. A clutch assembly according to claim 1, said cam surfaces being axially directed and of generally convex configuration rising along a relatively steep angle from a valley then merging into a relatively shallow angle and terminating in an abutment at the peak of each cam surface.

5. A clutch assembly according to claim 4, said lugs being defined by radially projecting portions on said driving member normally disposed in the valleys between said cam surfaces and movable outwardly first along the steeper angles then along the more gradual slopes in response to the application of torque to said driving member.

6. An automatic locking gear adapted to drivingly connect a driving member to a driven member automatically in response to the application of torque to the driving member, said locking gear comprising:
   a stationary housing having a locking member thereon,
   a drive gear and a driven gear associated with said drive member and driven member, respectively, said drive gear being movable into intermeshing engagement with said driven gear,
   a cam member journaled in said housing and biased into engagement with said locking member so as to be normally fixed against rotation when torque is not applied to the driving member, and
   a cam follower member interposed between said cam member and said drive gear, said cam follower member responsive to rotation of said driving member to disengage said cam member from engagement with said locking member while advancing said drive gear into intermeshing engagement with said driven gear.

7. An automatic locking gear according to claim 6, including a bearing assembly interpositioned between said housing and said cam member, said bearing assembly including biasing means yieldably urging said cam member into locking engagement with said locking member.

8. An automatic locking gear according to claim 7, said bearing assembly defined by a roller bearing having compressible rollers adapted to impose a predetermined resistance to rotation of said cam member when released from engagement with said locking member.

9. An automatic locking gear according to claim 6, said cam member operative to displace said cam follower for a distance sufficient to advance said drive gear into intermeshing engagement with said driven gear while displacing said cam member a distance sufficient to disengage it from said locking member whereby said cam member is then free to follow rotation of said drive gear.

10. An automatic locking gear according to claim 9, said cam member having a series of cam surfaces formed in a ring, and axially protruding dogs on said cam follower movable along said cam surfaces in response to rotation of said drive gear.

11. An automatic locking gear according to claim 10, said cam surfaces extending in an axial direction toward said driven gear at equally spaced circumferential intervals, said cam surfaces being of generally convex configuration each rising upwardly along a relatively steep slope from a valley then merging into a more gradual slope and terminating in an abutment at the peak of each cam surface.

12. An automatic locking gear according to claim 6, said locking member being free to undergo limited rotation in response to the application of torque to said drive gear.

13. In a four wheel drive mechanism for a motor vehicle, an automatic locking gear adapted to drivingly interconnect a drive axle and a wheel hub automatically in response to application of torque to said drive axle, said locking gear comprising:
a stationary housing in which said drive axle is journaled, and said wheel hub journaled in outer concentric relation to said housing,
a drive gear keyed for rotation with said drive axle while being slidable in an axial direction independently of said drive axle, a plurality of cam followers drivingly connected to said drive gear, a driven gear keyed for rotation with said wheel hub while being slidable in an axial direction independently of said wheel hub, said drive gear being movable into intermeshing engagement with said driven gear, and spring means normally urging said drive gear away from engagement with said driven gear, and a clutch assembly including a cam retainer member, a bearing assembly and cam lifter means interposed between said bearing assembly and said cam retainer member, resilient means normally urging said cam lifter means into engagement with said cam retainer member so as to be fixed against rotation when torque is not applied to said drive axle, and said cam lifter means including axially directed cam surfaces extending toward said drive gear to be engaged by the cam followers on said drive gear, said cam lifter means operative in response to torque applied to said drive axle to overcome the urging of said resilient means and be disengaged from said cam retainer member while increasing the rotational resistance of said bearing assembly to rotation of said cam lifter means as said cam followers are displaced in a direction causing said drive gear to be axially advanced into intermeshing engagement with said driven gear.

14. An automatic locking gear according to claim 13, said bearing assembly including a static race and a driven race disposed in spaced parallel relation to one another, and compressible bearings interposed between said races, said resilient means interposed between said driven race and said cam lifter means.

15. An automatic locking gear according to claim 14, said static race and driven race having correspondingly sloped confronting surfaces in contact with opposite surfaces of said bearings.

16. An automatic locking gear according to claim 15, said static race being affixed to said stationary housing and said driven race being affixed to said cam lifter means, said axially directed cam surfaces being of a configuration such that rotational movement of said cam lifter means is gradually accelerated as said cam lifter means returns into engagement with said cam retainer member.

17. In a four-wheel drive for a motor vehicle according to claim 13, said cam retainer member being free to undergo limited rotation over a distance as least as great as the circumferentially directed movement of said cam lifter means relative to said cam surfaces in advancing said drive gear between a disengaged and engaged position, and spring means urging said retainer member in a direction opposing limited rotation of said cam retainer member in response to rotation of said cam lifter means.

18. In a four-wheel drive according to claim 13, said cam retainer and said cam lifter means having interengaging teeth therebetween so as to fix said cam lifter means against rotation with respect to said cam retainer member when torque is not applied to said drive axle.

* * * * *